United States Patent [19]
Ross

[11] Patent Number: 5,648,770
[45] Date of Patent: *Jul. 15, 1997

[54] APPARATUS AND METHOD OF NOTIFYING A PARTY OF A PENDING DELIVERY OR PICKUP

[75] Inventor: John Ross, Marietta, Ga.

[73] Assignee: Worldwide Notification Systems, Inc., Atlanta, Ga.

[*] Notice: The term of this patent shall not extend beyond the expiration date of Pat. No. 5,444,444.

[21] Appl. No.: 417,947

[22] Filed: Apr. 6, 1995

Related U.S. Application Data

[63] Continuation of Ser. No. 307,032, Sep. 16, 1994, Pat. No. 5,444,444, which is a continuation of Ser. No. 62,405, May 14, 1993, abandoned.

[51] Int. Cl.$^6$ .................................................. G08G 1/123
[52] U.S. Cl. ........................... 340/994; 340/988; 364/436; 455/457
[58] Field of Search ..................................... 340/988, 989, 340/990, 991, 992, 993, 994, 995, 996; 364/436, 401, 424.01, 424.02, 449; 379/58, 59; 342/457

[56] References Cited

U.S. PATENT DOCUMENTS

| | | | |
|---|---|---|---|
| 3,886,515 | 5/1975 | Cottin et al. | 340/994 |
| 4,791,571 | 12/1988 | Takahashi et al. | 340/994 |
| 5,153,836 | 10/1992 | Fraughton et al. | 340/961 |
| 5,208,590 | 5/1993 | Pitts | 340/990 |
| 5,400,020 | 3/1995 | Jones et al. | 340/994 |
| 5,444,444 | 8/1995 | Ross | 340/994 |

*Primary Examiner*—Brent A. Swarthout
*Attorney, Agent, or Firm*—Howrey & Simon; Thomas J. Scott, Jr.

[57] ABSTRACT

An apparatus and method for notifying a party of a pending delivery or pickup of an item. A mobile vehicle or carrier is equipped with a satellite receiver, a controller and a communicator. The mobile vehicle determines its location based on positioning signals received by the satellite receiver. The controller compares the current location of the vehicle to the location of the party receiving the delivery/pickup. The communicator conditionally communicates with the party to notify the party of the pending delivery/pickup.

16 Claims, 2 Drawing Sheets

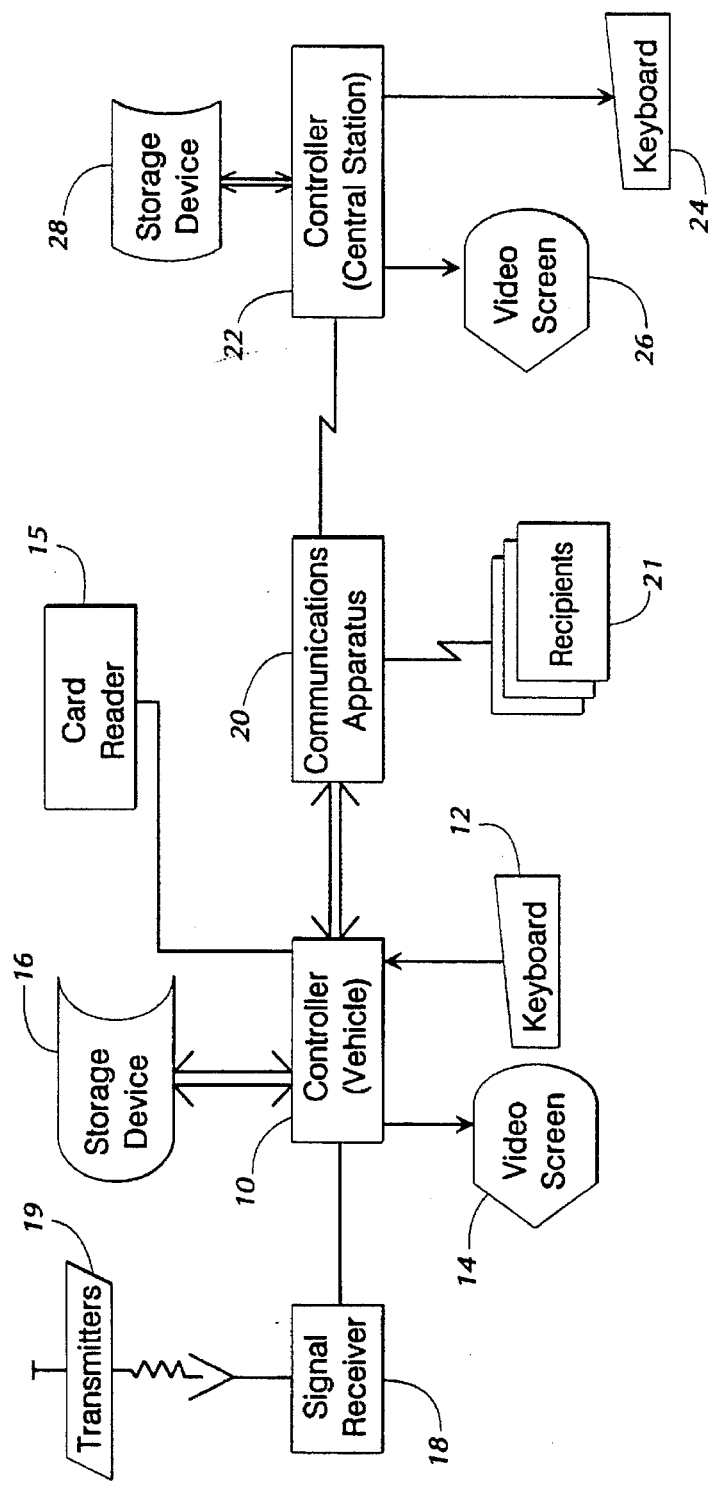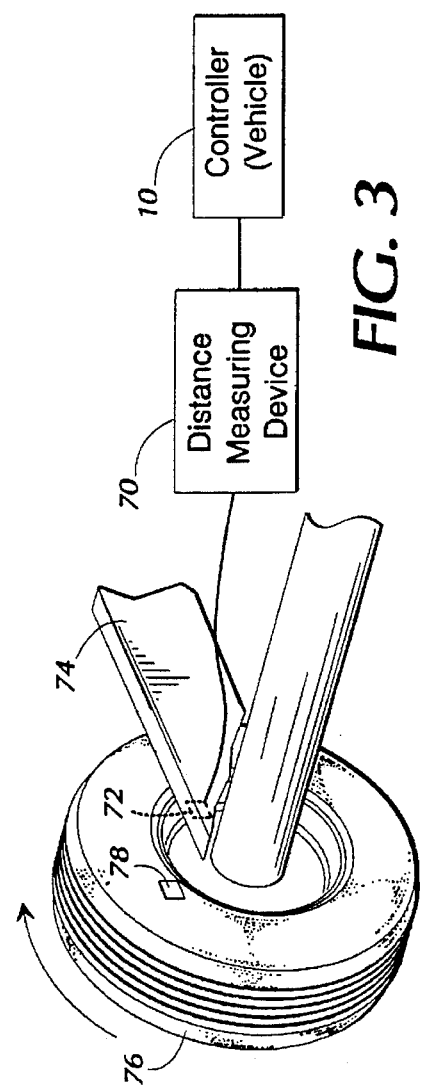

APPARATUS AND METHOD OF NOTIFYING A PARTY OF A PENDING DELIVERY OR PICKUP

CROSS-REFERENCE TO RELATED APPLICATIONS

This application is a continuation of application Ser. No. 08/307,032, filed Sep. 16, 1994, now U.S. Pat. No. 5,444,444, which was a continuation of application Ser. No. 08/062,405 filed May 14, 1993 and now abandoned.

TECHNICAL FIELD

The present invention relates to a method and apparatus of notifying a recipient of a delivery or pickup. More particularly, the present invention relates to a method and apparatus of signalling advance notice of an unscheduled delivery of an item to a recipient.

BACKGROUND OF THE INVENTION

For many years, delivery systems have operated independently of a recipient for an item carried from a sender by a delivery service to the recipient. This involves an unscheduled delivery of the item to the recipient. The term "unscheduled delivery" as used herein refers to delivery of articles, items, packages or the like to a recipient at a time that is not specifically prearranged with the recipient. For example, a recipient orders an article from a mail-order catalog service. Delivery is to occur generally within some time period, but no specific day or time is arranged. The term "scheduled delivery" refers to an arrangement whereby the delivery service is to deliver the item to the recipient at a specific time. Due to delays inherent in delivery schedules, travel, and time spent at each delivery location, scheduled deliveries are difficult to maintain.

In most circumstances, however, the system of unscheduled delivery is satisfactory. For instance, regular delivery of mail typically does not require advance scheduling or notification of delivery of items for a recipient. Generally, the delivery occurs at approximately the same time each day, and for homes and businesses, such regular and routine delivery at or about the approximate same time is satisfactory for receiving items. In those instances where a receipt, payment, or signature of the recipient is required, the carrier contacts the recipient at the time of delivery. If contact cannot be made, the carrier leaves a notice of attempted delivery. The recipient then contacts either a central distribution center or the carrier for arranging delivery.

Such notice of attempted delivery and having to make arrangements for delivery is both time consuming and troublesome. The recipient either must make arrangements to meet the carrier or travel to the central facility for delivery of the item. It may take as much as several days to coordinate the delivery of the item.

In many instances however, unscheduled delivery of packages is satisfactory for recipients. Many commercial delivery systems carry packages from a sender to a recipient. The delivery company receives the package and groups it with other packages in a selected geographic area. A route list is developed so that the packages are delivered in a particular sequence. Various mechanisms are known to select and arrange a delivery sequence for a route list. The carrier follows the sequential route list and delivers the packages to recipients. For business delivery, a clerk typically is available during the day for receiving such unscheduled delivery of packages. For home delivery the carrier may be authorized to leave the item irrespective of whether a recipient is present. In other situations, the carrier leaves the package with a neighbor.

Many delivery companies offer a service of delivering a package by a preselected time. The problem remains, however, that some packages will be delivered before others are delivered, before the predetermined time. In circumstances where a clerk or recipient is available, such mechanisms are satisfactory.

In many circumstances advance notice of pending delivery of an item would facilitate the delivery. These circumstances include the requirement that a particular individual sign papers acknowledging delivery or the recipient is not present at the delivery site but could be available given reasonable advance notice. In these circumstances, failure to deliver requires that separate arrangements must be made for delivery. Again, this is time consuming and troublesome for recipients. Often the recipient could reach the delivery site or be available if reasonable advance notice of the unscheduled delivery were provided by the carrier to the recipient. Currently, the only advance notice that is available is either the general provision for delivery of an item before a particular time or by attempting to deliver the package and leaving a message for the recipient to contact the carrier.

Accordingly, there is a need in the art for an apparatus and method of signalling a reasonable advance notice of an unscheduled delivery of an item to a recipient.

SUMMARY OF THE INVENTION

The present invention provides an apparatus and method for signalling reasonable advance notice of a pending delivery or pickup of an item from a party. More particularly described, the present invention provides a carrier with a receiver for receiving a positioning signal from transmitters at known locations. An analyzer evaluates the positioning signals to determine the position of the carrier. The position of the carrier is compared with a predetermined delivery location for the recipient. A time interval is computed for the carrier to move to the delivery or pickup location. When the time interval is less than a predetermined time interval, a signal is communicated to the recipient to provide reasonable advance notice of the pending unscheduled delivery or pickup of the item.

Further, the invention provides a method of signalling advance notice of an unscheduled delivery or pickup of an item to a party. The method comprises receiving a plurality of positioning signals from transmitters broadcasting from known fixed locations. The signals are analyzed to determine the position of the carrier. This determined position is compared to the predetermined known location of the unscheduled delivery or pickup. A time interval is determined for the carrier to arrive at the delivery location. If the time interval to move from the predetermined position to the location of the party is less than a predetermined interval, a signal is generated to provide notice to the party of the pending delivery or pickup of the item at an unscheduled time.

Accordingly, it is an object of the present invention to improve delivery and pickup of items at an unscheduled time to a recipient.

It is another object of the present invention to reduce the delay time in delivery of an item to a recipient.

It is another object of the present invention to reduce the wasted time recipients expend waiting for delivery of an item.

It is another object to increase the efficiency of carriers delivering items at unscheduled times to recipients.

These and other objects, advantages and features of the present invention will become apparent from a reading of the following detailed description of the invention and claims in view of the appended drawings.

BRIEF DESCRIPTION OF THE DRAWINGS

FIG. 1 is a schematic view of the apparatus of the present invention for signalling notice of an unscheduled delivery of an item to a recipient.

FIG. 3 is a perspective partial view of a motor vehicle having a distance measuring device for use by the apparatus illustrated in FIG. 1 for determining location.

DETAILED DESCRIPTION OF THE PREFERRED EMBODIMENT

Figure 2:
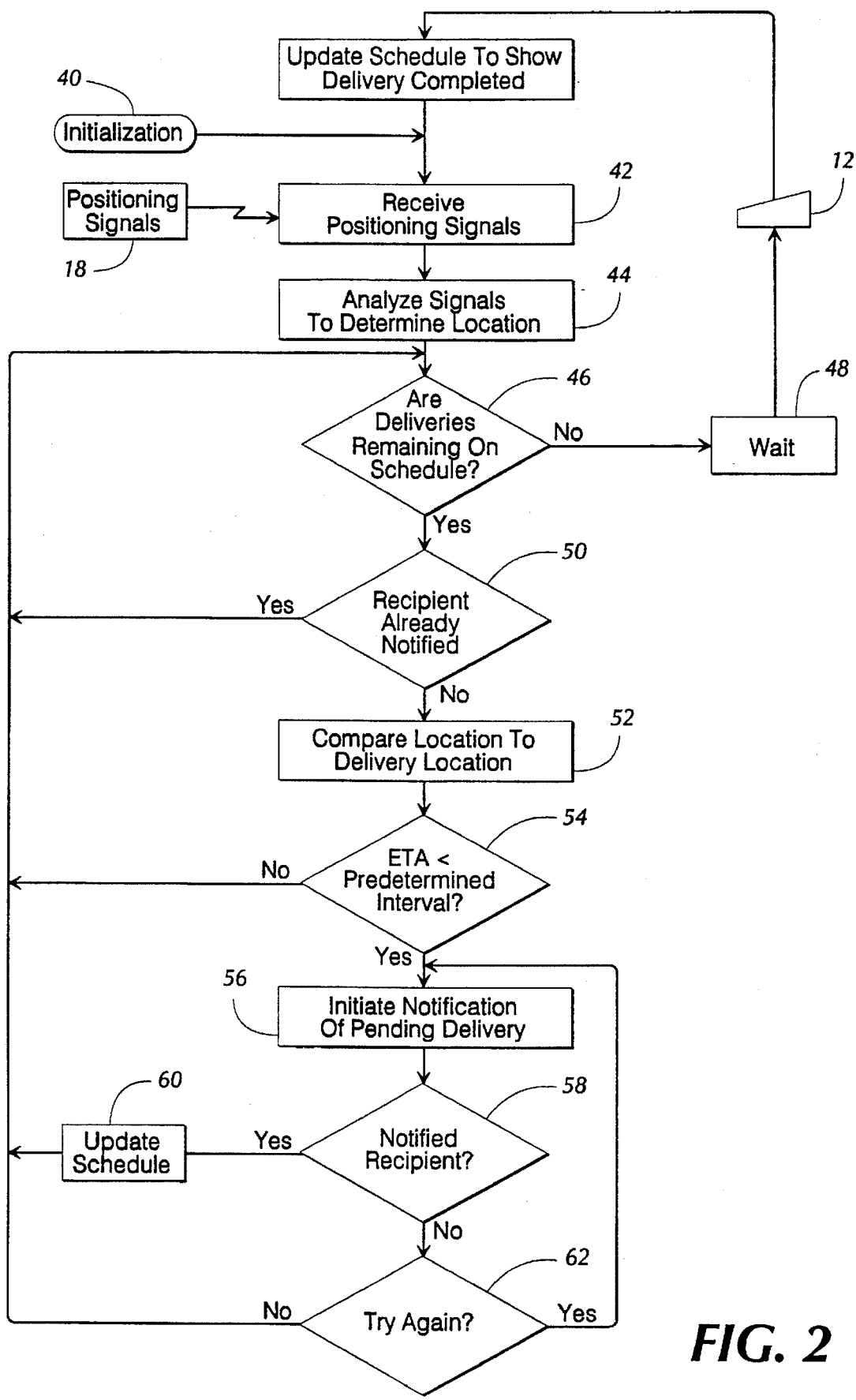
FIG. 2 is a flow chart illustrating the method of the present invention that signals notice of a pending unscheduled delivery of an item to a recipient.

Referring now in more detail to the drawings, in which like numerals indicate like parts throughout the several views, FIG. 1 illustrates a schematic view of a preferred embodiment of an apparatus for signalling advance notice of an unscheduled delivery of an item to a recipient.

The apparatus and method of the present invention accordingly facilitates scheduling of an unscheduled delivery of an item to a recipient. A delivery vehicle for a carrier includes a controller 10, such as a microprocessor device. The controller 10 includes peripheral equipment for providing information to the controller and for displaying information. For example, a keyboard 12 enters information and commands to the controller 10. The information includes identification of the carrier, completion of a delivery, and the like. Other devices may be used for entering such information and commands. These devices include bar-scan codes and readers, card scanners, and keypads. A video screen 14 displays information such as that regarding the delivery route list, directions, special instructions, and delivery locations. The controller 10 communicates with a storage device 16, such as a magnetic media disk drive. The storage device 16 includes an accessible file of the information regarding the delivery of packages to various locations on the particular route. The information maintained on the storage media 16 includes, for example, the name and address of the recipient, a package identification code, a location code, directions and special instructions. Other information can be included on the storage media 16. The controller also communicates with a receiver 18 that receives a positioning signal from remote known transmitters 19. Each of the transmitters broadcast a specific signal from a known location on a known radio frequency. The controller 10 therefore is an electronic complex operatively associated with the carrier for delivering items to recipients.

The controller 10 operatively communicates with a communications apparatus 20. In a preferred embodiment of the present invention, the communications apparatus 20 includes a transmitter, receiver, and dialing means for accessing commercially available cellular telephone systems. The controller 10 in the delivery vehicle communicates through the communications apparatus 20 to a selected one of a plurality of recipients 21 of articles and packages to be delivered by the carrier operating the particular delivery vehicle. The communications apparatus also provides a path for communicating delivery status information between the controller 10 in the delivery vehicle and a central controller 22.

The central controller 22 is preferably a main-frame computer or the like. The central controller 22 preferably is located at a stationary facility such as company offices for the delivery company. The central controller 22 communicates through a multiplexer with a plurality of controllers 10, each in one of the delivery vehicles for the delivery company. The central controller 22 includes peripheral devices for entering information to the controller, such as a keyboard 24. Other peripheral devices such as card readers and scanners can likewise be used to enter information to the controller 22. Information maintained by the controller 22 is displayed on a video screen 26. Written reports of information are produced on a printer (not illustrated) attached to the controller 22. The controller accesses a storage device 28, such as a high speed magnetic disk drive. The storage device 28 maintains information such as route, package identification, recipient name and address, phone numbers and the like. The central controller 22 therefore is an electronic complex for coordinating and monitoring the delivery schedules of the various routes travelled by the carrier.

FIG. 2 illustrates a flow chart of a preferred method of signalling advance notice of pending delivery of an item at an unscheduled time to a recipient, using the apparatus of the present invention. The carrier uses the keyboard 12 or other input device to enter information to the controller 10. Prior to beginning a sequence or route of deliveries, the controller 10 is initialized 40. During initialization, certain information is provided to the controller 10, including a code identifying the carrier, the delivery vehicle involved, its route, and other related information. The carrier begins to drive the delivery vehicle to the first location on his scheduled route for an item to be delivered. The controller 10 receives positioning signals 42 from the receiver 18. In a preferred embodiment of the present invention, the receiver 18 receives signals transmitted by satellites using the global positioning system generally known as GPS. In other embodiment, the receiver receives LORAN signals. The signals are analyzed 44 to determine the location of the delivery vehicle. The positioning signals are analyzed to determine a longitudinal/latitudinal coordinate of the position of the delivery vehicle. The controller 10 accesses the storage media 16 to determine whether deliveries remain on the schedule 46. In the event no deliveries remain on the schedule to be considered, the controller 10 waits 48 for the carrier to enter information.

If deliveries remain on the schedule, the controller 10 compares the location of the delivery vehicle to the delivery location for each package to be delivered in sequence. The controller 10 first accesses the data storage device 16 to determine if the recipient of that particular delivery has already been notified 50 of the pending delivery of the item. If the recipient has already been notified of delivery, the controller 10 considers the next delivery in the sequence of deliveries.

Otherwise, the controller 10 compares 52 the location of the delivery vehicle to the delivery location. The controller 10 then determines an estimated time of arrival at that delivery location. In determining the time of arrival for each delivery location, the controller 10 accounts for the distance and time required to travel between the two locations and accounts for the intervening deliveries and estimated time to make these deliveries. The controller 10 thereby determines an estimated time of arrival for the particular delivery. If the period 54 for the estimated time of arrival is greater than a predetermined interval, the controller 10 repeats 46 the analysis for the next delivery in the sequence of deliveries. If the estimated time of arrival is less than the predetermined interval, the controller 10 initiates 56 notification of arrival for delivery. The controller 10 uses its communications apparatus 20 to communicate 58 with the selected recipient 21. In a preferred embodiment, the controller 10 dials the telephone number of the recipient using cellular telephone equipment. The controller 10 initiates a series of questions to the recipient 21, using voice generation equipment and tone recognition to interpret responses. The responses by the recipient 21 are made to the controller 10 by pushing selected keys on a touch-tone telephone.

After the recipient 21 has been notified of the pending delivery within the predetermined interval, the controller 10 updates 60 the data storage device 16 to indicate that particular delivery has been confirmed with the recipient. If the recipient 21 cannot be contacted, the system may try 62 more than one time to notify the recipient of pending arrival. For example, the recipient's telephone may be busy or not answered. After a predetermined number of attempts to notify the recipient of arrival, the controller 10 abandons the efforts to notify the recipient and evaluates the next delivery on the schedule of deliveries.

After all remaining deliveries on the route list have been evaluated, the controller 10 waits 48 for the carrier to enter delivery information to the controller 10. The carrier in the meantime is travelling to the next delivery location or is delivering items to recipients.

The carrier enters the delivery information to the controller 10 after one or more packages at the location have been delivered to the recipient. The carrier enters through the keyboard 12 the information needed to update the route schedule and to show that delivery has been completed for particular items. Upon receiving information that delivery of a particular package has been completed, the controller 10 begins the analysis process over again 42 by receiving positioning signals. This method of tracking deliveries, analyzing locations and estimated times of delivery, and notifying recipients of pending delivery continues for the remaining schedule of deliveries.

A preferred embodiment of the present invention uses a Travelmate 4000 Texas Instrument notebook computer for the controller 10. This notebook computer includes the keyboard 12 and the display monitor 14. The controller 10 communicates with the signal receiver 18, for receiving the GPS positioning signals. The notebook computer communicates in both a transmitting and receiving mode with the communications apparatus 20 which preferably is a cellular telephone apparatus. For transmitting, the notebook communicates through an interface including a Texas Instruments SN65CBC176 driver to a cellular modem for accessing the cellular system. A Texas Instruments TL052 amplifier feeds the signal from the driver to a TLE2062 amplifier to match with telephone line signals. For receiving, the cellular modem communicates with a Texas instruments SN75CBC176 receiver through a TLE2062 line matching amplifier and a TL052 amplifier. A Texas Instruments TLC1550 analog-to-digital converter converts the received signal for input to the notebook computer through an interface that includes a Texas Instruments SN75LBL176 receiver. This enables the controller 10 to access the communications apparatus 20 for communicating with the central station 22 or with a selected recipient 21.

As discussed above, the present invention facilitates notification of recipients of the pending occurrence of an unscheduled event. The recipients are notified in advance so that they may react to the occurrence of the event. One particular application of the present apparatus and method invention is notification of the arrival of a school bus at a neighborhood pickup/drop-off point referred to herein as a bus stop. With advance notice of arrival of the bus, riders thereby reduce their time expended waiting at the bus stop. This is particularly advantageous during severe weather conditions, such as extreme cold temperatures, or precipitation such as rain or snow. The school bus contains the controller 10 with the receiver 18. In addition to the keyboard 12, the controller 10 preferably communicates with a card reader (not illustrated). Each bus rider is issued a magnetic ID card. The card identifies the rider and allows the controller 10 to maintain ridership information on the storage device 16. With the apparatus and method of the present invention, the rider for the bus would not need to leave his home until notified by the apparatus of the pending arrival of the bus.

In an alternate embodiment illustrated in FIG. 3, the bus includes a distance measuring device 70 in addition to the receiver 18. The distance measuring device 70 comprises a magnetic sensor 72 that mounts on a frame member 74 of the bus near a wheel 76 or a drive shaft (not illustrated). A magnet 78 mounts in radial alignment with the magnetic sensor 72. As the magnet 78 rotates and travels past the sensor 72, a signal is generated and communicated to the controller 10. The controller 10 uses the series of signals from the magnetic sensor 72 to measure the distance the bus has travelled. Combining the GPS information with the distance measuring information provides a more precise location of the bus.

With reference to FIG. 2, the bus operator uses the apparatus by first initializing the controller 10 to identify the bus and the particular bus route. The distance measuring system and GPS continually signal the controller 10 the location of the bus. The controller 10 analyzes the positioning and distance measuring signals. Thus, the wait state 48 is not used. The controller 10 compares the location of the bus to the location of the school bus stops in sequence. The controller 10 then determines the estimated time of arrival at the particular bus stop being evaluated. In determining the time of arrival for each bus stop in sequence, the controller accounts for the distance and time required to travel between location of the bus and the location of the particular bus stop, including the time for any intervening bus stops. The controller 10 thereby determines an estimated time of arrival for the particular bus stop.

If the period before the estimated time of arrival at the bus stop is greater than a predetermine interval, the controller 10 repeats the analysis for the next bus stop in the sequence in the route. For this particular application, an interval of about three minutes is sufficient. If the estimated time of arrival is less than the predetermined interval, the controller 10 initiates notification of arrival of the bus. The controller 10 transfers the rider's telephone number held on the storage device 16 to the communications apparatus 20 which preferably places a telephone call to the rider. The controller 10 updates the device 16 to indicate that the particular rider has been notified of pending arrival. The controller 10 then repeats the evaluation for the next and each subsequent stop on the route. The bus driver continues travelling to the bus stops on the route.

At the bus stop, the rider enters the bus and registers with the controller 10. In a preferred embodiment, this is accomplished by using the card scanner, although bar code scanners or keypad entry may be used. Ridership information is collected and used for scheduling and route evaluation purposes. The controller 10 continues to receive the GPS and distance measuring information as discussed above to evaluate its location and to determine whether riders for the remaining bus stops have to be notified of pending arrival of the bus as discussed above.

At predetermined intervals, the controller 10 accesses the communication apparatus 20 to communicate with the controller 22 at a central station. Among other information, the controller 10 communicates its location. This allows supervisors at the central station to monitor the location of the buses on various routes within the system.

The apparatus and method of the present invention further is applied in the transportation industry, and particularly for the air transport industry. Broadly speaking, passengers on an aircraft are items to be delivered to recipients (i.e., persons meeting the passenger at the airport). For example, a family or business associate of an airline passenger must depart from a home or a business at a particular time before the estimated arrival of the aircraft to timely meet the arriving passenger. Presently, the recipient must telephone the airline to determine whether the flight is expected to arrive at its scheduled time. This is inconvenient to both the recipient and to the airline company. The recipient may be receiving untimely information due to delays in updating the computer network that tracks air flights for the company. The recipients further lose time on the telephone attempting to determine when to leave for the airport. The airline company is inconvenienced by its telephone lines being congested by recipients inquiring as to the status of arriving flights. The airline loses time and money since its agents spend time on the telephone giving out flight arrival information instead of selling tickets.

The apparatus and method of the present invention, however, overcomes these problems. A passenger provides the airline with a contact number and an interval of time prior to arrival for notifying the contact of the pending arrival. For example, on a typical business day it takes approximately one and one-half hours to drive from central London, England to Gadwick Airport. A passenger flying into Gadwick Airport provides the airline with a contact number in London of a person to notify of the pending arrival. This person is the recipient, as that term is used in this application. As the aircraft approaches the airport, it reaches a point where the interval of time between that point and the airport equals the notification interval for the particular passenger. The controller 10, monitoring the location of the aircraft, compares the interval of time for the estimated arrival at Gadwick with the notification interval for the passengers, in sequence. When the interval of time before arrival is less than the interval given by a particular passenger for notifying his recipient, the controller 10 contacts the recipient. In this way, flight departure delays and in-flight delays are accommodated. The recipient leaves no earlier for the airport than is reasonably necessary to arrive at approximately the time the aircraft is to arrive. This reduces the wait in a crowded gate area and facilitates scheduling of passengers and recipients in crowded airport areas.

The present invention accordingly provides an apparatus and method of notifying a recipient of a pending delivery of an item at an unscheduled time. The present invention reduces time wasted waiting for delivery, waiting for information regarding deliveries, and facilitates deliveries. The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departing from the spirit of the invention as described in the following claims.

What is claimed is:

1. An apparatus located on a mobile vehicle for providing separate notices to each of a plurality of parties of a pending delivery/pickup of a different item, each said item being uniquely associated with one of said parties, said apparatus comprising:
   a satellite receiver for receiving positioning signals from a plurality of satellites;
   a storage device for storing the location of each said party;
   a processor electrically connected to said storage device and said satellite receiver, said processor programmed to perform the following steps for each said item:
   a) determining a current location of the mobile vehicle based upon the received positioning signals;
   b) selecting an item;
   c) comparing the current location of the mobile vehicle to the location of the party associated with said selected item;
   a communicator operating under control of the processor for automatically communicating, based upon said step of comparing, a signal via a cellular communications network from the mobile vehicle to each said party to notify each said party of the pending delivery/pickup of the item uniquely associated with that party.

2. The apparatus of claim 1, wherein said satellite receiver comprises a global positioning system (GPS) receiver for receiving positioning signals from a plurality of GPS satellites.

3. The apparatus of claim 1, wherein said controller comprises a microprocessor.

4. The apparatus of claim 1, wherein said processor comprises a microprocessor that determines the latitude and longitude of the mobile vehicle based upon the received positioning signals.

5. The apparatus of claim 1, further comprising a keyboard for inputting information to the processor, and a video display for displaying information.

6. The apparatus of claim 1, wherein the storage device stores a delivery route list, and delivery locations for a plurality of deliveries/pickups.

7. The apparatus of claim 1 wherein said communicator comprises a cellular telephone.

8. The apparatus of claim 1 wherein said mobile vehicle is a bus that provides advance notice of the arrival of the bus at the delivery/pickup point.

9. The apparatus of claim 8 wherein the bus provides advance notice of the arrival of the bus to the riders of the bus or to other persons specified by each of the riders, to thereby minimize waiting time of the bus riders at the delivery/pickup point.

10. The apparatus of claim 8, further comprising an input device electrically connected to the processor for allowing the processor and the storage device to store and maintain information on the riders of the bus.

11. The apparatus of claim 10, wherein said input device comprises a card reader, each of said bus riders being issued an identification card which allows the processor to maintain ridership information.

12. The apparatus of claim 11 wherein each rider registers with the processor using his/her identification card upon entering the bus, thereby allowing the processor to determine what riders for remaining delivery/pickup points still remain on the bus and allowing the processor and the communicator to notify a contact party for each rider of the pending delivery of each rider.

13. The apparatus of claim 1, further comprising a distance measuring device connected to said processor for measuring the distance the vehicle has traveled for providing additional location information to the processor.

14. The apparatus of claim 1 wherein said processor is further programmed to estimate the time required for the vehicle to travel from its current location to the party's location based on the distance separating the location of the vehicle and the location of the party.

15. The apparatus of claim 14 wherein said processor estimates the time interval required for the vehicle to travel from its current location to the party's location based on the distance separating the location of the vehicle and the location of the party and the time for any intervening stops.

16. An apparatus located on a mobile vehicle for providing separate notices to each of a plurality of parties of a pending delivery/pickup of a different item, each said item being uniquely associated with one of said parties, said apparatus comprising:

a satellite receiver for receiving positioning signals from a plurality of satellites;

a storage device for storing the location of each said party;

a processor electrically connected to said storage device and said satellite receiver, said processor programmed to perform the following steps for each said item:
  a) determining a current location of the mobile vehicle based upon the received positioning signals;
  b) selecting an item;
  c) comparing the current location of the mobile vehicle to the location of the party associated with said selected item;

a voice generator operating under control of the processor and operatively connected to said processor for automatically generating voice signals for communicating with said party; and a communicator operating under control of the processor for automatically communicating voice signals generated by said voice generator, based upon said step of comparing, a signal via a cellular communications network from the mobile vehicle to each said party to notify each said party of the pending delivery/pickup of the item uniquely associated with that party.

* * * * *

UNITED STATES PATENT AND TRADEMARK OFFICE
CERTIFICATE OF CORRECTION

PATENT NO.   : 5,648,770
DATED        : July 15, 1997
INVENTOR(S)  : Ross et al.

It is certified that error appears in the above-identified patent and that said Letters Patent is hereby corrected as shown below:

<u>Title page,</u>
Item [75], add the folowing inventors:

-- Martin Kelly Jones, Delray Beach, Fl.
   Mark Stubbins, Bradenton, Fl. --

Signed and Sealed this

Second Day of September, 2003

JAMES E. ROGAN
*Director of the United States Patent and Trademark Office*